United States Patent [19]

Trube et al.

[11] Patent Number: 4,741,258
[45] Date of Patent: May 3, 1988

[54] DEFROSTING DEVICE FOR THE INTERIOR OF MOTOR VEHICLE WINDSHIELDS

[75] Inventors: Hans Trube, Herrenberg; Klaus Arold, Sindelfingen, both of Fed. Rep. of Germany

[73] Assignee: Daimler-Benz Aktiengesellschaft, Stuttgart, Fed. Rep. of Germany

[21] Appl. No.: 933,804

[22] Filed: Nov. 24, 1986

[30] Foreign Application Priority Data

Nov. 22, 1985 [DE] Fed. Rep. of Germany ....... 3541284

[51] Int. Cl.$^4$ .............................................. B60H 1/00
[52] U.S. Cl. ..................................... 98/2.08; 98/2.09
[58] Field of Search ........................... 98/2.08, 2.09, 2; 137/883

[56] References Cited

U.S. PATENT DOCUMENTS

| | | | |
|---|---|---|---|
| 1,750,485 | 3/1930 | Muller | 137/883 |
| 2,016,019 | 10/1935 | Muvrin | 98/2.08 |
| 2,304,642 | 12/1942 | Hans | 237/12.3 |
| 3,608,469 | 9/1971 | Mutoh et al. | 98/2.09 |
| 4,223,754 | 9/1980 | Mizuno et al. | 98/2.09 |

FOREIGN PATENT DOCUMENTS 2648663 5/1978 Fed. Rep. of Germany .
3211962 10/1982 Fed. Rep. of Germany .

*Primary Examiner*—Albert J. Makay
*Assistant Examiner*—David W. Westphal
*Attorney, Agent, or Firm*—Barnes & Thornburg

[57] ABSTRACT

A defroster air vent arrangement is provided for uniformly distributing the air flow discharged from a defroster onto motor vehicle windshields which defroster air vent arrangement allows for adequate defrosting of the entire windshield in an open and in a partially closed positioning of the defrosting device. The vent arrangement is formed with a defroster nozzle connected to an air distributor housing. A defroster nozzle is provided with a wall web dividing the defroster nozzle into air guiding ducts of unequal cross-sectional areas and the air distributor housing is provided with an adjustable covering device providing for a selectively independent regulation of the flow of the defroster air into the air distributor housing and through to the windshield.

8 Claims, 1 Drawing Sheet

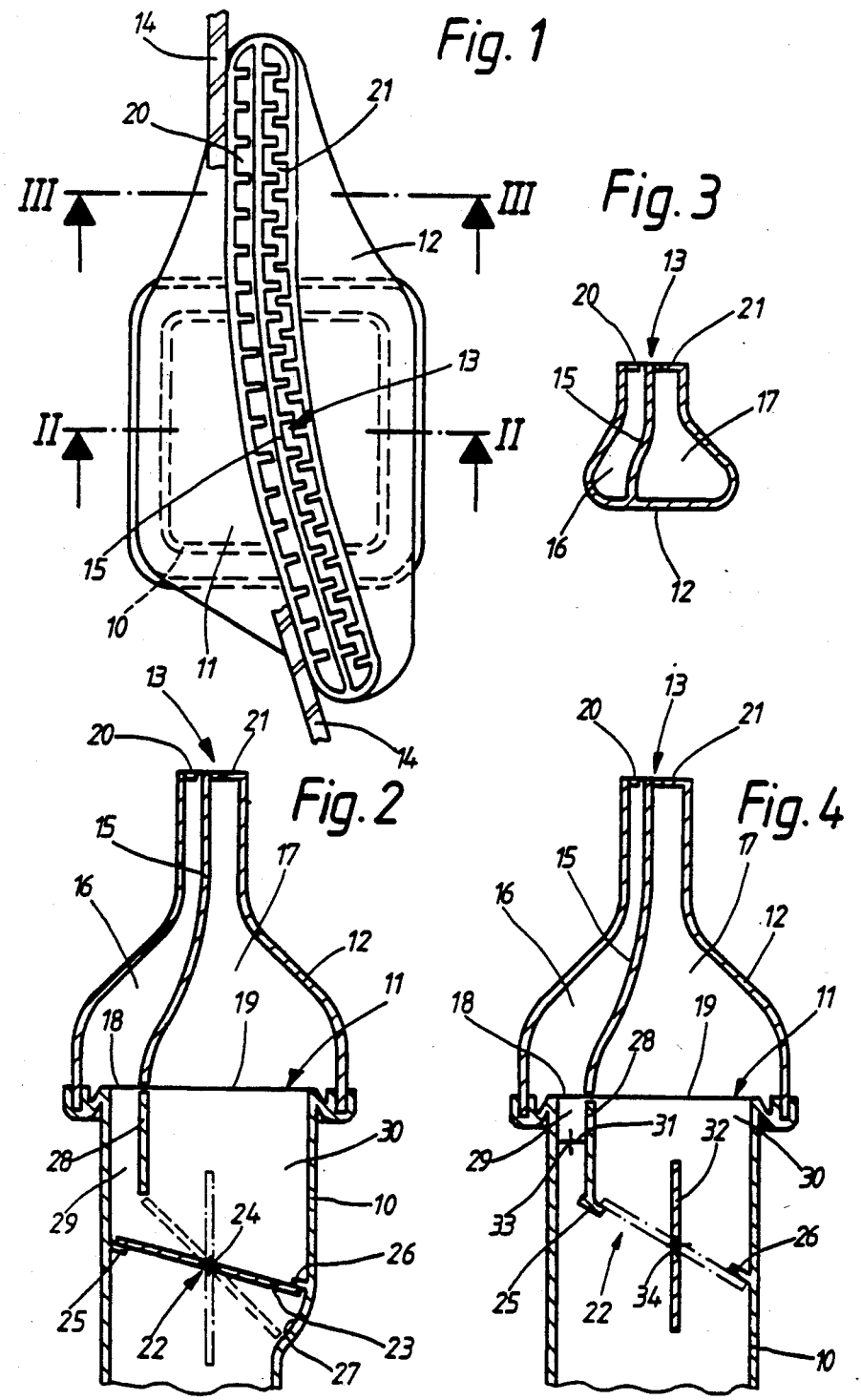

DEFROSTING DEVICE FOR THE INTERIOR OF MOTOR VEHICLE WINDSHIELDS

BACKGROUND AND SUMMARY OF THE INVENTION

The invention relates to a defroster air vent arrangement having an air distributor housing with an adjustable covering device and having a defroster nozzle for regulating the flow of defroster air and for distributing the defroster air onto the interior portion of the motor vehicle windshields.

It appears that such a defroster vent arrangement has been contemplated. This arrangement serves, with an adjustable covering device inside the air distributor housing to allow a flow of defroster air to escape past the adjustable covering device and to be distributed through the defroster nozzle onto the windshield of a motor vehicle. When the adjustable covering device is in the open position, the whole current of warm or mixed air entering into the air distribution housing flows into the defroster nozzle. After the defrosting has taken place, the covering may be closed so that at least by far the largest part of the warm air flowing into the air distributor housing is deflected and is discharged via lateral or leg room nozzles.

In a known arrangement of the initially mentioned type, the defroster air flowing to the windshield during the closed operation of the adjustable covering device has the purpose of keeping the windshield defrosted during the further course with defrosting of the windshield only in the area where the defroster air is distributed to the windshield through the mouth of the defroster nozzle resulting in the disadvantage that an insufficient defrosting is provided to the central viewing area of the windshield producing the undesirable effect that the driver's view of the outside environment is limited. Furthermore, because a clear viewing area is helpful in the safe operation of the motor vehicle, the driver must frequently open and close the adjustable covering device or position the adjustable covering device to a setting allowing for a continuous large volume of defroster air flow to reach the windshield resulting in an undesirable draft phenomena occurring particularly at the level of the heads of the occupants of the motor vehicle causing their discomfort.

An objective of the invention is to provide a defroster vent arrangement of the above-mentioned type with constructively simple means so that defroster air is distributed to the windshield in sufficient volume to provide an adequate defrosting of the entire windshield when the adjustable covering device is in a partially closed position.

This objective is achieved according to preferred embodiments of the invention by providing a defroster vent arrangement which includes an air distributor housing means having an adjustable covering means for selectively regulating the flow of the defroster air through the air distributor housing means, and having connecting duct means of unequal cross-sectional areas, a defroster nozzle means having guiding air duct means of unequal cross-sectional areas and having a mouth means for uniformly distributing the defroster air onto the windshield, and a defroster nozzle connecting means for connecting the defroster nozzle means to the air distributor housing means.

When the defroster nozzle is divided into parallelly aligned air guiding ducts of substantially unequal cross-sectional areas by a wall web and is arranged over the air distributor housing having a free-ending web aligned vertically below the wall web in the defroster nozzle creating connecting ducts of correspondingly substantially unequal cross-sectional area continuing into the air guiding ducts and a sufficient flow of defroster air is selectively allowed to pass through the connecting duct and air guiding duct of the smaller cross-sectional area through an air outlet arranged in the mouth of the defroster nozzle extending along the substantial length of the windshield and positioned closest to the windshield there is permitted a constantly maintained defrosting of the entire windshield when the adjustable covering device is in the partially closed position. Because the adjustable covering device is further positionable, the full flow of the defroster air reaches the windshield through both air outlets of the mouth of the defroster nozzle when the adjustable covering device is in open positions and the defroster air can be prevented from entering into the connecting ducts and is deflected against the adjustable covering device and is discharged from the air distributor housing through lateral or legroom nozzles when the adjustable covering device is in the closed position.

In an especially preferred embodiment of the invention a single pivotable flap is provided to form the adjustable covering device and is selectively operable to all desired defroster air flow regulating positions.

In certain preferred embodiments of the invention first and second pivotable flaps are provided to form the adjustable covering device. The first pivotable flap is arranged inside the connecting duct of the smaller cross-sectional area and is independently selectively operable to an open and closed position. The second pivotable flap is arranged inside the connecting duct of the larger cross-sectional area and is independently selectively operable to an open and closed position, allowing selection of all desired defroster air flow regulating positions.

Further objects, features, and advantages of the present invention will become more apparent from the following description when taken with the accompanying drawings which show, for purposes of illustration only, an embodiment/several embodiments in accordance with the present invention.

BRIEF DESCRIPTION OF THE DRAWINGS

FIG. 1 is a top schematic part-sectional view of a defroster nozzle and air distributor housing adjacent a vehicle windshield, constructed in accordance with a preferred embodiment of the present invention;

FIG. 2 is a sectional view taken along line II—II of FIG. 1;

FIG. 3 is a sectional view taken along line III—III of FIG. 1; and

FIG. 4 is a schematic part-sectional view similar to FIG. 2, which shows an adjustable covering device with two independent selectively operable flaps, constructed in accordance with another preferred embodiment of the invention.

DETAILED DESCRIPTION OF THE DRAWINGS

A defroster nozzle 12 is connected to an air distributor housing 10 vertically above the air distributor housing 10. A wall web 15 is arranged inside the defroster nozzle 12 extending from the mouth 13 of the defroster nozzle 12 to the air distributor end of the defroster nozzle 12 and dividing the defroster nozzle 12 into parallelly aligned air guiding ducts 16, 17 of substantially unequal cross-sectional area. The air guiding ductd 16, 17 open through air outlet openings 20, 21 of correspondingly substantial unequal cross-sectional area into the mouth 13 of the defroster nozzle 12 and open through air inlet openings 18, 19 of correspondingly substantial unequal cross-sectional area into the air distributor housing 10.

The mouth 13 of the defroster nozzle 12 extends substantially along the entire width of the windshield 14 and is arranged approximately parallel to the contour of the schematically depicted windshield 14. The air outlet opening of the smaller cross-sectional area 20 is arranged in the mouth 13 of the defroster nozzle 12 at the area closest to the windshield 14.

A free ending web 28 is arranged in the upper portion of the air distributor housing 10 forming connecting ducts 29, 30 of substantial unequal cross-sectional area. The defroster nozzle 12 is connected to the air distributor housing 10 with the wall web 15 in vertical alignment with the free ending web 28 providing respectively contiguous passage ways of substantially similar cross-sectional area for the selective channeling of defroster air into the passage ways onto the windshield 14 through the air outlet openings 20, 21 in the mouth 13 of the defroster nozzle 12.

A pivotable flap 23 is fixedly arranged on the inside of the air distributor housing 10 below the end of the free-ending web 28 to pivot about the midline of the flap 24 providing an adjustable covering device 22 for selectively regulating the flow of defroster air into the connecting ducts 29, 30. Stops 25, 26 are oppposingly formed on the interior wall of the air distributor housing 10 creating a sealing effect at the area where the pivotable flap 23 is positioned to rest against the stops 25, 26 when the adjustable covering device 22 is in the closed position providing the effect that the defroster air is prevented from entering the connecting ducts 29, 30 and from flowing into the defroster nozzle 12, and is discharged out of the air distributor housing 10 through lateral or leg nozzles.

When the adjustable covering device 22 is positioned in the partially closed position one end of the pivotable flap 23 abuts against the end of the free-ending web 28 and the other end of the pivotable flap 23 abuts against the interior wall of the air distributor housing 10 contracted at the area of abutment 27 creating a sealing effect at the area of the connecting duct of the larger cross-sectional area 30 providing the effect that an increased flow of defroster air is channeled only into the connecting duct and air guiding duct of the smaller cross-sectional areas 29, 16 and providing continuously adequate defrosting of the windshield 14. When the adjustable covering device 22 is positioned in the fully open position the pivotable flap 23 is arranged to permit the entire volume of the defroster air entering the air distributor housing 10 to flow unimpaired into the connecting ducts 29, 30 through the defroster nozzle 12 and through the air outlet openings 20, 21 onto the windshield 14. The pivotable flap 23 is further arranged to allow selective positioning of the adjustable covering device 22 permitting a regulated flow of defroster air to pass into the connecting duct 30 of the larger cross-sectional area.

The FIG. 4 illustration of the cross-section of the defroster nozzle 12 and air distributor housing 10 shows the adjustable covering device 22 is formed from two pivotable flaps 31, 32. The first pivotable flap 31 is independently operable and is fixedly arranged inside the connecting duct of the smaller cross-sectional area 29 to pivot about the midline 33 of the pivotable flap 31 creating a sealing effect at the area of the interior of the connecting duct of the smaller cross-sectional area 29 when the adjustable covering device 22 is in the closed position and providing the effect that the defroster air is prevented from passing into the air guiding duct of the smaller cross-sectional area 16 and through the connecting duct of the smaller cross-sectional area 29.

The second pivotable flap 32 is independently operable and fixedly arranged inside of the connecting duct of the larger cross-sectional area 30 to pivot about the midline 34 of the pivotable flap 32. A first stop 25 is arranged on the bottom of the free-ending web 28 and a second stop 26 is opposingly formed on the interior wall of the air distributor housing 10, creating a sealing effect at the area where the second pivotable flap 32 rests against the stops 25, 26 when the adjustable covering device 22 is in the closed or partially closed positions and providing the effect that the defroster air is prevented from entering the air guiding duct of the larger cross-sectional area 17 through the connecting duct of the larger cross-sectional area 30, and providing the effect that a regulated flow of the defroster air is selectively allowed to pass through the connecting duct 30 of the larger cross-sectional area when the adjustable covering device 22 is positioned in various open positions.

When the adjustable covering device 22 is positioned in the partially closed position the entire increased flow of the defroster air passes only through the connecting duct 29 and air guiding duct 16 of the smaller cross-sectional area providing continuously adequate defrosting of the windshield 14. When the adjustable covering device 22 is positioned in the fully open position the full flow of the defroster air is permitted to pass through the connecting ducts 29, 30 and through the defroster nozzle 12 providing complete defrosting of the windshield 14.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A defroster air vent arrangment having an air distributor housing and having a defroster nozzle for regulating and for distributing the flow of defroster air onto the interior portion of the windshield of a motor vehicle, said defroster air vent arrangement comprising:
air distributor housing means having an adjustable covering means for selectively regulating the flow of the defroster air through the air distributor housing means and having connecting duct means of unequal cross-sectional areas,
defroster nozzle means having air guiding duct means of unequal cross-sectional areas, and having a mouth means for uniformly distributing the defroster air onto the windshield, and
defroster nozzle connecting means for connecting the defroster nozzle means to the air distributor housing means,
wherein a wall web means is arranged inside the defroster nozzle means forming parallelly aligned air guiding duct means of unequal cross-sectional areas, wherein the air guiding duct means open into the mouth means on one end through air outlet openings of correspondingly unequal cross-sectional areas and open into the air distributor housing means on the other end through air inlet openings of corresponding unequal cross-sectional areas, wherein the mouth means extends along a substantial portion of the windshield and is aligned substantially parallel to the contour of the windshield, wherein the air outlet opening of the smaller cross-sectional area is arranged in the mouth means at the area closest to the windshield, wherein a free ending web means is arranged inside the air distributor housing means forming duct connecting means of unequal cross-sectional areas, wherein the wall web means of the defroster nozzle means is arranged in vertical alignment over the free ending web means of the air distributor housing means at the area where the defroster nozzle connecting means connects the defroster nozzle means to the air distributor housing means, wherein the adjustable covering means is formed with a flap means pivotably arranged inside the air distributor housing means permitting selective positioning of the adjustable covering means, wherein the flap means rests at both ends against stops opposingly formed on the interior wall of the air distributor housing means when the adjsutable covering means is positioned in the closed pivoting position preventing the flow of defroster air into the connecting duct means of the smaller cross-sectional area and of the larger cross-sectional area, and wherein the flap means at one end abuts against the free-ending web means and at the other end abuts against a contracted area of the interior wall of the air distributor housing means when the adjustable covering means is positioned in the partially closed pivoting position for allowing the defroster air to pass into the duct connecting means of the smaller cross-sectional area and preventing the passage of defroster air into the connecting duct means of the larger cross-sectional area.

2. An arrangement according to claim 1, wherein the adjustable covering means is selectively positionable into other pivoting positions permitting the full flow of the defroster air to pass into the connecting duct means of the smaller cross-sectional area and a regulated flow of the defroster air to pass into the connecting duct means of the larger cross-sectional area.

3. A vent arrangement for the interior of a motor vehicle having an air distributor housing with at least one air outlet opening through which defroster air is selectively allowed to flow and having a defroster air nozzle covering the air outlet opening opening into a mouth extending along a portion of the windshield of a motor vehicle for guiding the defroster air flow onto the windshield and having an adjustable covering for regulating the defroster air flow, said vent arrangement comprising:

a wall web extending from the mouth end of the defroster nozzle to the other end of the defroster nozzle dividing the defroster nozzle into two air guiding ducts of unequal cross-section, air outlet openings opening through the mouth parallelly aligned and in approximate parallel alignment with the windshield, air inlet openings opening through the other end of the defroster nozzle, an adjustable covering developed to permit the air guiding duct of the smaller cross-section to remain open to the flow of defroster air when the air guiding duct of the larger cross-section is closed to the flow of defroster air.

4. An arrangement according to claim 3, wherein the air outlet opening of the air guiding duct of the smaller cross-section is arranged closest to the windshield.

5. An arrangement according to claim 4, wherein the adjustable covering is formed from a single pivotable flap arranged to cover the air inlet openings when positioned in a first pivoting position and further arranged to cover the air inlet opening opening into the air guiding duct of the larger cross-section and permitting the flow of defroster air through the air inlet opening opening into the air guiding duct of the smaller cross-section when positioned in a second pivoting position and further arranged to permit the flow of defroster air through the air inlet opening opening into the air guiding duct of the smaller cross-section and permitting selective regulation of the defroster air through the air inlet opening opening into the air guiding duct of the larger cross-section.

6. An arrangement according to claim 5, wherein the pivotable flap is arranged inside the air distributor housing below the distributor housing air outlet opening and arranged to pivot about a pivot arranged approximately in the center of the pivotable flap and wherein a free-ending web is arranged inside the air distributor housing extending in alignment to the wall web inside the defroster nozzle and further arranged to permit the air guiding ducts in the defroster nozzle to continue into the air distributor housing creating duct connection pieces in the air distributor housing and wherein the pivotable flap and the air distributor housing are arranged to cover the entire cross-section of the air distributor housing at the area below the duct connection pieces when the adjustable covering is in the first pivoting position and is further arranged to permit one end of the pivotable flap to abut against the end of the free-ending web and the other end to abut against the interior wall of the air distributor housing clearing only the connection duct piece opening into the air guiding duct of the smaller cross-section for the passage of the defroster air when the adjustable covering is in the second pivoting position and is further arranged to permit the positioning of one end of the pivotable flap inside the duct connection piece opening into the air guiding duct of the larger cross-section with the positioning of the other end of the pivotable flap in the inside of the air distributor housing when the adjustable covering is positioned in other pivoting positions.

7. An arrangement according to claim 6, wherein the adjustable covering is arranged inside the air distributor housing below the air distributor housing opening and wherein the free-ending web is arranged inside the air distributor housing extending in alignment to the wall web inside the defroster nozzle and further arranged to permit the air guiding ducts in the defroster nozzle to continue into the air distributor housing creating connection duct pieces in the air distributor housing and wherein the adjustable covering is formed from two pivotable flaps arranged inside the duct connection pieces.

8. An arrangement according to claim 7, wherein the pivotable flaps are independently operable.

* * * * *